(12) United States Patent  (10) Patent No.: US 8,558,443 B2
Koppermann  (45) Date of Patent: Oct. 15, 2013

(54) METHOD FOR CONTROLLING A HEADLIGHT ASSEMBLY FOR A VEHICLE AND HEADLIGHT ASSEMBLY THEREFOR

(75) Inventor: Rolf Koppermann, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 284 days.

(21) Appl. No.: 13/126,522

(22) PCT Filed: Oct. 29, 2009

(86) PCT No.: PCT/EP2009/064287
§ 371 (c)(1),
(2), (4) Date: Jul. 8, 2011

(87) PCT Pub. No.: WO2010/049487
PCT Pub. Date: May 6, 2010

(65) Prior Publication Data
US 2011/0261574 A1  Oct. 27, 2011

(30) Foreign Application Priority Data
Oct. 30, 2008  (DE) .................. 10 2008 053 945

(51) Int. Cl.
*B60Q 1/14* (2006.01)
(52) U.S. Cl.
USPC ............ 313/465; 362/466; 362/487; 362/525
(58) Field of Classification Search
None
See application file for complete search history.

(56) References Cited

U.S. PATENT DOCUMENTS

| | | | | |
|---|---|---|---|---|
| 5,099,400 A | * | 3/1992 | Lee | 362/37 |
| 6,908,207 B2 | * | 6/2005 | Jeannot | 362/37 |
| 2002/0195949 A1 | * | 12/2002 | Stam et al. | 315/82 |
| 2008/0117642 A1 | * | 5/2008 | Moizard et al. | 362/466 |
| 2009/0073706 A1 | * | 3/2009 | Tatara et al. | 362/487 |
| 2009/0086496 A1 | * | 4/2009 | Todani et al. | 362/465 |

FOREIGN PATENT DOCUMENTS

| | | |
|---|---|---|
| DE | 102007038084 A1 | 2/2009 |
| EP | 2060441 A1 | 5/2009 |
| EP | 2062775 A1 | 5/2009 |
| EP | 2135774 A2 | 12/2009 |
| SE | 181374 C | 11/1962 |
| WO | 86/05147 A1 | 9/1986 |
| WO | 2008/037388 A2 | 4/2008 |
| WO | 2010/049487 A1 | 5/2010 |

OTHER PUBLICATIONS

International Search Report and Written Opinion for Application No. PCT/EP2009/064287 (10 pages), published: Jan. 29, 2010.

* cited by examiner

*Primary Examiner* — Ashok Patel
(74) *Attorney, Agent, or Firm* — King & Spalding L.L.P.

(57) ABSTRACT

In a method for controlling a headlight assembly for a vehicle (10) with a right and a left headlight unit (1, 2), for a dipped-beam function, the optical axes (L1, L2) of the headlight units (1, 2) are tilted away from one another horizontally relative to a parallel direction. According to the method for a main-beam function, the optical axes (L1, L2) of the headlight units (1, 2) are tilted toward one another horizontally relative to a parallel direction. A respective headlight assembly can be particularly suitable for carrying out the method.

20 Claims, 4 Drawing Sheets

METHOD FOR CONTROLLING A HEADLIGHT ASSEMBLY FOR A VEHICLE AND HEADLIGHT ASSEMBLY THEREFOR

CROSS-REFERENCE TO RELATED APPLICATIONS

This application is a U.S. National Stage Application of International Application No. PCT/EP2009/064287 filed Oct. 29, 2009, which designates the United States of America, and claims priority to German Application No. 10 2008 053 945.7 filed Oct. 30, 2008, the contents of which are hereby incorporated by reference in their entirety.

TECHNICAL FIELD

The present invention relates to a method for controlling a headlight assembly for a vehicle comprising a right and a left headlight unit, wherein for a dipped-beam function the optical axes of the headlight units are tilted away from one another horizontally relative to a parallel orientation. Furthermore, the invention relates to a headlight assembly for a vehicle comprising a right and a left headlight unit and at least one control device, wherein for a dipped-beam function the optical axes of the headlight units may be tilted away from one another horizontally relative to a parallel orientation by means of the control device.

BACKGROUND

It is the task of a headlight assembly of a vehicle to illuminate the traffic zone driving in front of the vehicle as best as possible during darkness. Typically, provided therefor is a main-beam function, which supplies a light distribution comprising a very large range of coverage. However, using the main-beam function leads to the problem that other traffic participants, in particular the drivers of oncoming vehicles or vehicles driving in front, are blinded by the light emission of the high beam. For this reason, further typically a dipped-beam function is provided by the headlight assembly whose light distribution indeed still provides a preferably broad illumination of the traffic zone in front of the vehicle, which, however, at the same time does not lead to a blinding of other traffic participants. Typically, the driver of the vehicle manually switches back and forth between the dipped-beam function and the main-beam function. However, this requires a high concentration of the driver and may lead to a distraction from other security relevant information. Therefore, headlight assemblies have been developed by means of which traffic participants can be detected in the direction of the light emission of the headlight assembly and the overall light distribution of the headlight assembly is adapted to the position of a detected traffic participant such that he/she is not blinded anymore. For example, given in WO 2008/037388 A2 is a method for controlling a headlight assembly for a vehicle, where the directions of emissions of the light beams of the headlight units are tilted away from one another horizontally for a dipped-beam function in order to prevent a blinding of another detected traffic participant.

SUMMARY

According to various embodiments, a method for controlling a headlight assembly and a headlight assembly for a vehicle can be provided, by means of which the driver of the vehicle can be provided with a best possible view onto the roadway in front of him/her and at the same time the blinding of other traffic participants is avoided effectively.

According to an embodiment, in a method for controlling a headlight assembly for a vehicle comprising a right and a left headlight unit, for a dipped-beam function, the optical axes of the headlight units are tilted away from one another horizontally relative to a parallel orientation, and for a main-beam function, the optical axes of the headlight units are tilted towards one another horizontally relative to a parallel orientation.

According to a further embodiment, a traffic participant can be detected in direction of the light emission of the headlight assembly and the light distribution generated by the headlight assembly for the dipped-beam function can be controlled depending on the position of the traffic participant relative to the vehicle. According to a further embodiment, the light distribution generated by the headlight assembly for the dipped-beam function can be altered such that in direction of the detected traffic participant a central area comprising lesser headlight range and on both sides lateral to the central area lateral zones comprising larger headlight range are formed. According to a further embodiment, the angle of a traffic participant vertical relative to the headlight assembly can be detected in direction of the light emission of the headlight assembly and for the dipped-beam function, the headlight range in direction of the detected traffic participant can be controlled depending on the vertical angle of the traffic participant. According to a further embodiment, for the main-beam function, the optical axes of the headlight units can be tilted downward vertically relative to a horizontal orientation. According to a further embodiment, for the main-beam function, the optical axes of the headlight units can be tilted such that they intersect in the center between the headlight units at a defined distance in front of the vehicle. According to a further embodiment, the intersection point of the optical axes can be located in a range of 200 m to 500 m in front of the vehicle.

According to another embodiment, a headlight assembly for a vehicle comprising a right and a left headlight unit and at least one control device, wherein for a dipped-beam function the optical axes of the headlight units may be tilted away from one another horizontally relative to a parallel orientation by means of the control device, and wherein for a main-beam function, the optical axes of the headlight units may be tilted towards on another horizontally relative to a parallel orientation by means of the control device.

According to a further embodiment of the headlight assembly, the headlight assembly can be coupled with a device for detecting a traffic participant in direction of the light emission of the headlight assembly and light distribution may be adjusted by means of the control device depending on the position of the other traffic participant relative to the vehicle. According to a further embodiment of the headlight assembly, for the main-beam function, the headlight assembly may comprise a memory in which parameters for the tilting angles of the optical axes of the headlight units are stored.

BRIEF DESCRIPTION OF THE DRAWINGS

The invention will now be described by means of an exemplary embodiment and with reference to the accompanying drawings.

DETAILED DESCRIPTION

Figure 1:
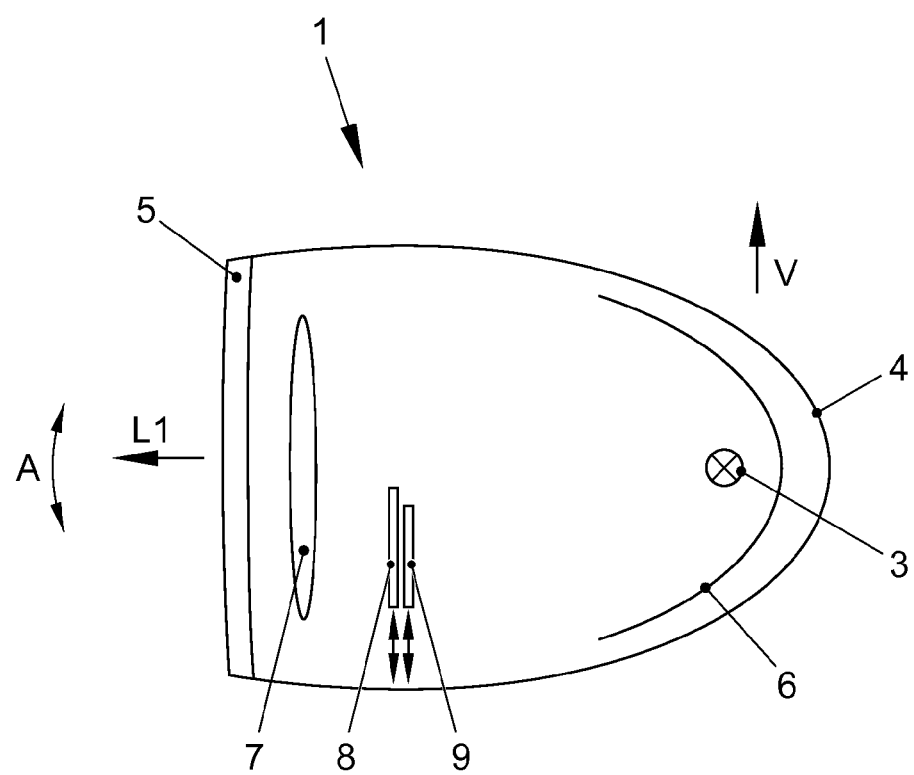
FIG. 1 schematically shows an exemplary embodiment of a headlight unit of the headlight assembly, FIG. 2 schematically shows an exemplary embodiment of the headlight assembly.

In the method according to various embodiments for a main-beam function, the optical axes of the headlight units are tilted toward one another horizontally relative to a parallel orientation. Consequently, the optical axes of the headlight units intersect in a certain distance in front of the vehicle. Unlike with the tilting angle for the dipped-beam function they are not diverging. According to various embodiments, understood as a dipped-beam function is a light distribution by means of which it is avoided that other traffic participants are blinded. In doing so, considered as dipped-beam function not only is the conventional dipped head light, but also a conventional high beam light whose light distribution has been altered such that the blinding of other traffic participants is avoided. For example, such a dipped-beam function also is known as an adaptive high beam light or a masked high beam light. Considered as a main-beam function according to various embodiments is a light distribution, which is targeted towards a maximum illumination of the surrounding area in front of the vehicle without accounting for a possible blinding of other traffic participants.

The optical axes of the headlight units result from the main emission direction of the headlight units. Furthermore, they may result from the geometry of the headlight unit itself. When the headlight unit emits a parallel light beam, the optical axis is parallel to this light beam and passes through the light source of the headlight unit. When the headlight unit comprises several light sources, the optical axis, for example, proceeds through the center of the headlight unit and is aligned parallel to the light beam, which is emitted by the headlight unit. Furthermore, the optical axis may be in the direction of the maximum luminous intensity of the headlight unit. For example, the maximum intensity of illumination may be determined by means of a measurement screen, which, for example, is arranged in a distance of 10 m in front of the headlight unit and perpendicular to the light emission of the headlight unit.

According to an embodiment of the method, a traffic participant is detected in the direction of the light emission of the headlight assembly and the light distribution generated by the headlight assembly for the dipped-beam function is controlled relative to the vehicle, depending on the position of the traffic participant. In particular, the light distribution generated by the headlight assembly for the dipped-beam function is altered such that in the direction of the detected traffic participant a central area comprising lesser headlight range and on both sides adjacent to this central area a lateral zone comprising higher headlight range is generated. Furthermore, the vertical angle of a traffic participant relative to the headlight assembly in the direction of the light emission of the headlight assembly may be detected. In this case, the headlight range in the direction of the detected traffic participant further may be controlled depending on the vertical angle of the traffic participant for the dipped-beam function.

According to an embodiment of the method, the optical axes of the headlight units are tilted downward vertically relative to a horizontal orientation for the high beam function.

For the main-beam function, the optical axes of the headlight units particularly may be tilted such that they intersect at a defined distance in front of the vehicle in the center between the headlight units. For example, this intersection point of the optical axes is located in a range of 200 m to 500 m in front of the vehicle. In particular, the intersection point rests on the roadway or on a plane, respectively, which spans between the contact points of the tires with the roadway.

By means of the method according to various embodiments, on the one hand a dipped-beam function may be provided, by means of which the blinding of other traffic participants may be avoided. On the other hand, a main-beam function is provided, which provides an optimal illumination of the traffic zone in front of the vehicle. In doing so, the main-beam function of the method according to various embodiments differs from a conventional high beam function in that the headlight units are tilted toward one another horizontally relative to a parallel orientation and an intersection point of the optical axes results in front of the vehicle in the center between the headlight units.

The headlight assembly according to various embodiments is characterized in that for a main-beam function the optical axes of the headlight units may be tilted towards one another horizontally relative to a parallel orientation by means of the control device.

According to a further embodiment of the headlight assembly, this is coupled with a device for detecting a traffic participant in direction of the light emission of the headlight assembly. In this case, the light distribution is adjustable by means of the control device depending on the position of the other traffic participant relative to the vehicle.

Furthermore, the headlight assembly in particular comprises a memory in which parameters for the tilting angle of the optical axes of the headlight units for the main-beam function are stored. When switching from the dipped-beam function to the main-beam function the parameters stored in the memory are used to adapt the horizontal and vertical orientation of the optical axes from the dipped-beam function to the main-beam function. In this way, an optimum light distribution is provided, which results from the superposition of the light emission of the right and left headlight units.

Provided for the function for adapting the optical axes to the main-beam function also may be a separate control device. Further, this adaptation may be integrated into the control device or the control devices for the headlight unit(s) by means of a software module.

The headlight assembly comprises two projection headlights 1 and 2 being spaced apart from each other, which are arranged in a known manner in the front at the right and left sides of the vehicle and which each may form a headlight unit. Alternatively, one headlight unit may comprise several headlights. One of the projection headlights 1 is shown in FIG. 1. The projection headlight 2 arranged on the other side substantially is constructed in the same manner.

Depicted in FIG. 1 is a cross-section in a plane that is parallel to the plane spanned by the longitudinal axis of the vehicle and the vertical V. The projection headlight 1, in a known manner, comprises a light source 3 which is surrounded by a reflector 6 formed as an ellipsoid of rotation. Therefore, the reflector 6 has two focal points. The light source 3 is located in one of the focal points of the reflector 6. The light emitted by the light source 3 is reflected by the reflector 6 in the direction of light emission L1 of the projection headlight 1 in direction of a projection lens 7. The light emission direction L1 also constitutes the optical axis of the projection headlight. An aperture arrangement comprising the two-dimensional apertures 8 and 9 is arranged at the focal position of the projection lens 7 and close to the second focal point of the reflector 6. The normals of the two-dimensional apertures 8 and 9 substantially are arranged parallel to the light emission direction L1. The light source 3, the reflector 6, the lens 7 and the apertures 8, 9 are arranged within a housing 4 which is completed by a light panel 5.

In order to adjust the headlight range the projection headlight 1 is allowed to be tilted upwards and downwards in the direction of arrow A in a generally known manner, that is to say it may be tilted vertically. In addition, the light emission direction L1 of the projection headlight 1 is allowed to be tilted horizontally, that is about a vertical axis. Further, the headlight range and in particular the form of the light/dark boundary of the overall light distribution of the projection headlight 1 is allowed to be adjusted in that the apertures 8 and 9 are moved in vertical direction. In order to dislocate the apertures 8 and 9 a control device is provided.

Figure 2:
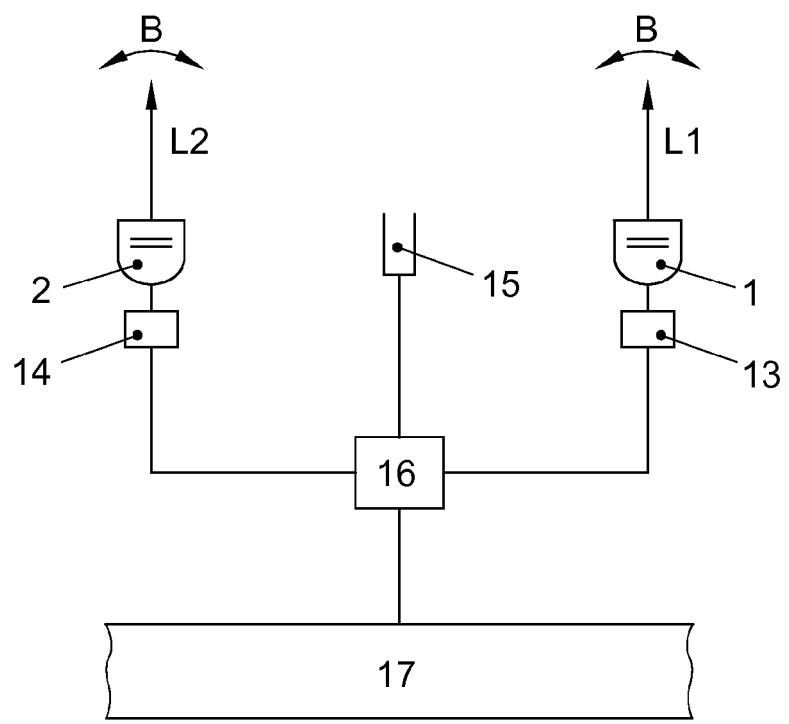

With reference to FIG. 2 it is described in the following how the right and the left headlight 1 and 2 of the headlight units of the headlight assembly are actuated:

The right headlight 1 is connected to a control device 13, the left headlight 2 is connected to a control device 14. On the one hand, these control devices 13, 14 control the tilting angle of the light beams emitted by the headlights 1 and 2 in the directions L1 and L2, in particular the tilting angle about a vertical and a horizontal axis. In this case, L1 and L2 also denominate the optical axes of the right and left headlight units. Further, the control devices 13 and 14 control the vertical position of the apertures 8 and 9 of the aperture assemblies for the right and left headlights 1, 2.

Furthermore, provided is a device 15 for detecting a traffic participant in direction of the light emission of the headlights 1, 2. This detection device 15 may be a camera comprising an image processing unit connected thereto, which detects the lights of vehicles driving in front and of oncoming vehicles. By means of the image processing device the direction of these lights may be detected in a horizontal as well as in a vertical direction. The image processing unit analyses the scene captured by the forward aligned camera. In this scene, the position of lights of vehicles driving in front and of oncoming vehicles is detected. With the help of the horizontal distance of two headlights or taillights of another vehicle, respectively, the image processing additionally may deduce the width of the vehicle. Lastly, light sources may be detected, which may suggest a street lighting or a town, respectively. As a general rule, street lighting is distinguishable from vehicle lights by means of the position in the camera image or by means of the intensity frequency modulated by the power line. The angle of aperture of the camera preferably corresponds to the angle of aperture of the headlight assembly.

The direction in the horizontal and vertical plane is transmitted by the detection device 15 to a control device 16, which in addition is connected to the control devices 13 and 14.

According to another embodiment of the system, the detection device 15 is designed as a laser or radar sensor by means of which the distance of objects in the direction of the light emission direction may be measured. In this connection, in particular also unlighted or insufficiently lighted traffic participants, such as pedestrians and where applicable also cyclists may be detected. In addition, by means of the distance measurement traffic participants may be detected selectively, who are arranged within the blinding boundaries of the high beam. Finally, by means of the measurement of distance, speed and direction of movement of the traffic participants a good classification of vehicles or traffic participants, respectively, may be carried out, whereby controlling errors of the headlight assembly are avoided. From the distance of the object the vertical angle can be calculated, which is used as a control factor for the headlight assembly.

In addition, it is possible with the distance measurement via the laser or radar sensor to discriminate a driving vehicle from standing objects by means of the speed detection. Furthermore, using a scanning laser distance measurement the width of the detected objects may be calibrated, so that the type of objects, i.e. whether it is a traffic participant, a motor vehicle or a cyclist, or a guide post, may be deduced with increased reliability.

The laser or radar sensor also may be combined with a camera to increase the reliability of detection, in particular with regard to the detection of the vertical position of the traffic participant. Since cameras, laser or radar sensors increasingly are used in vehicles comprising driving assistance systems, this sensor technology may also be used for controlling the headlight assembly, without additional costs being generated.

The control device 16 further is connected to a vehicle bus 17, by means of which further data detected in the vehicle may be transferred to the control device 16. In this way, for example, the steering angle or data from which the currently driven curve radius may be determined may be transferred to the control device 16.

With reference to the FIGS. 3 and 4 it will be described in the following, how the headlights 1 and 2 are actuated for the dipped-beam function in dependence on the data of the detection unit 15 and/or further data detected in the vehicle:

When other traffic participants are detected in the center driving in front of the own vehicle 10, as for example a vehicle 12 driving in front, the optical axes L1 and L2 of the two headlights 1 and 2 are tilted away from one another, and the two apertures 8 and 9 of the aperture assembly of the right as well as the aperture assembly of the left headlight 2 are brought into a position, in which, with respect to the overall light distribution, a central area comprising lesser headlight range is formed and in which the other traffic participant is arranged without being blinded.

Figure 3:
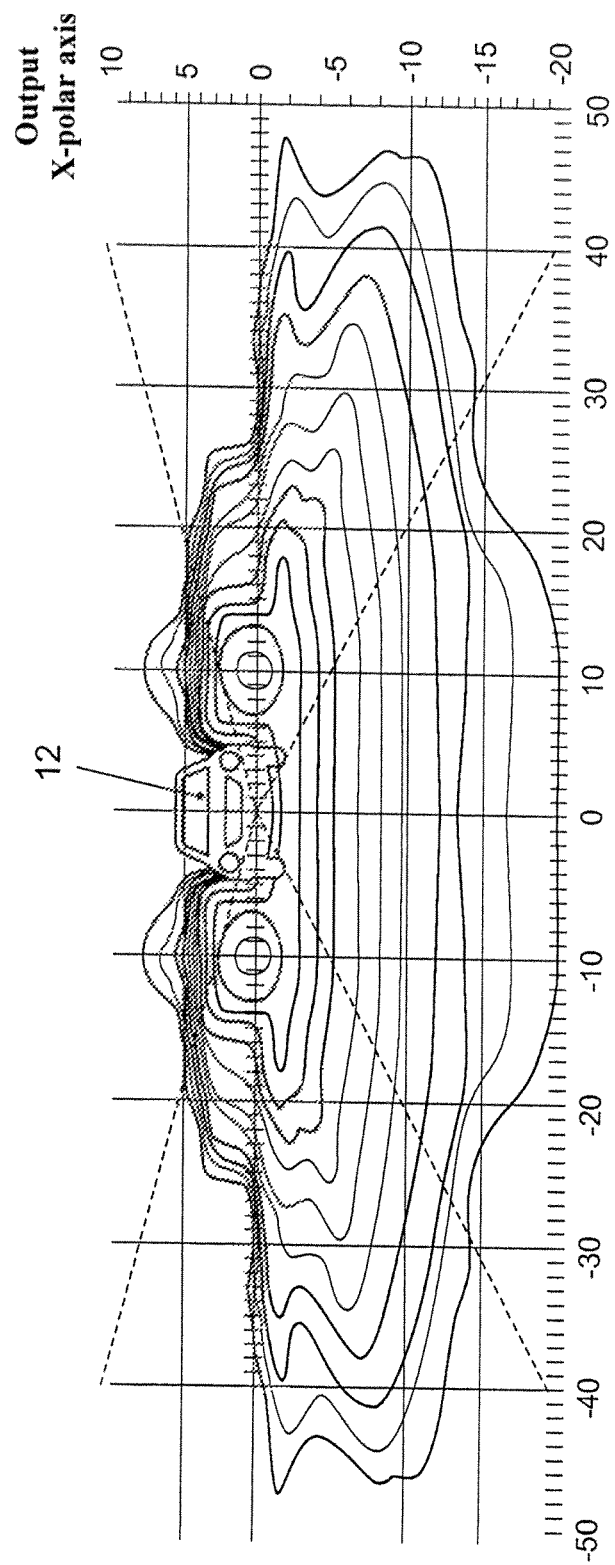
FIG. 3 shows an Isolux diagram of the overall light intensity distribution for the dipped-beam function on a vertical wall during detection of a vehicle driving in front.

Shown in FIG. 3 is an Isolux diagram comprising a light intensity distribution on a vertical wall as it is actuated for a dipped-beam function according to various embodiments, for example when a vehicle 12 driving in front is detected. In this case, the apertures 8 and 9 of the aperture assemblies for the right and the left headlights 1 and 2 are in a position in which a central area comprising lesser headlight range unfolds. Further, the optical axes L1 and L2 of the two headlights 1 and 2 are tilted away from one another to such an extent, that the width of the central area corresponds to the width of the vehicle 12. Therefore, in the center of the overall light distribution an area is left open for another traffic participant, so that he/she is not blinded.

Figure 4:
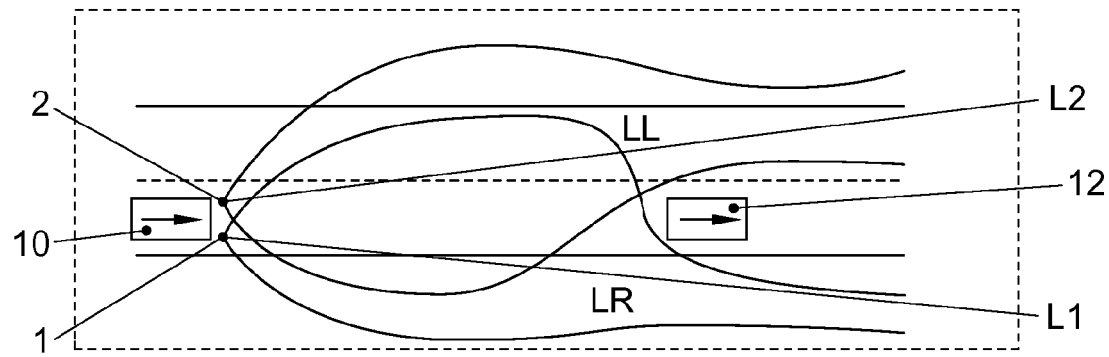
FIG. 4 shows the orientation of the optical axes of the headlight units for a dipped-beam function when a vehicle driving in front was detected.

Shown in FIG. 4 is the corresponding overall light distribution in a view from above. The illumination LR of the right headlight 1 is limited in the area of the roadway of the vehicle 10 as well as in the oncoming lane such, that the light/dark boundary comes up to the vehicle 12 driving in front as close as possible, however, a blinding of the driver of the vehicle 12 driving in front is avoided. In the area to the right beside the vehicle 12 driving in front, the right headlight 1 provides a high beam illumination without hereby blinding the driver of the vehicle 12 driving in front. Provided by the left headlight 2 is the illumination LL. That also is limited in the area of the roadway of the vehicle 10 such that the light/dark boundary comes up to the vehicle 12 driving in front as close as possible, however, a blinding of the driver of the vehicle 12 driving in front is avoided. An illumination comprising large coverage is provided in the area of the oncoming lane by the left headlight 2, so that the driver of the vehicle 10 is able to well oversee the oncoming lane.

The overall light distribution resulting from the illuminations LR and LL continuously is adjusted to the horizontal and vertical angles between the vehicle 10 and the vehicle 12 driving in front, so that in the central area the headlight range comes up to the vehicle driving in front as close as possible.

Figure 5:
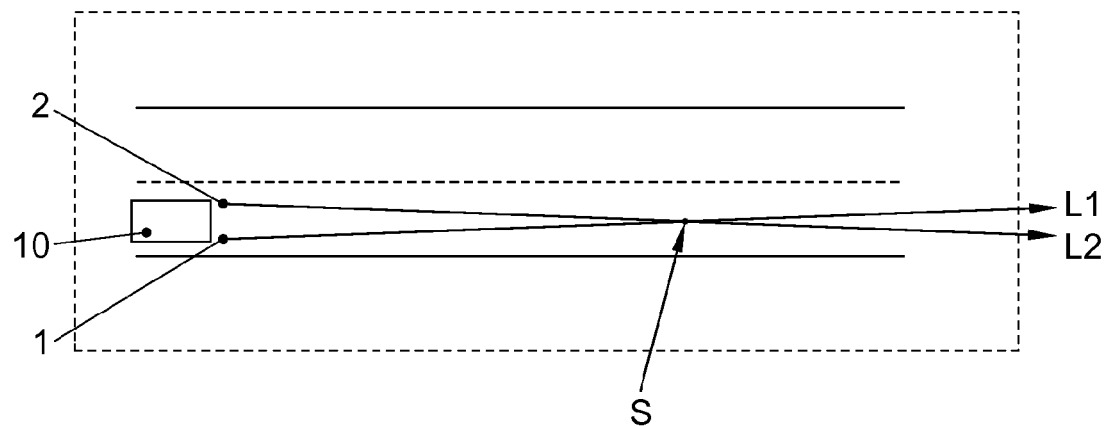
FIG. 5 shows the orientation of the optical axes of the headlight units for a main-beam function.

Referring to FIG. 5, in the following the modification of the alignment of the optical axes L1 and L2 during a changeover from the dipped-beam function to the main-beam function is described:

As described above, for the dipped-beam function the optical axes L1 and L2 are tilted away from one another in horizontal direction. Further, the overall light distribution provided for the dipped-beam function is masked by means of the apertures 8 and 9. At changeover to the main-beam function, which as a function of the detection device 15 may be actuated either manually or automatically by the control devices 13 and 14, the apertures 8 and 9 are backed out of the light emission of the headlights 1 and 2, so that the overall light distribution no longer is affected by the apertures 8 and 9. It has turned out that the overall light distribution resulting in this case indeed complies with a main-beam function, this overall light distribution, however, is insufficient for the driver with respect to the illumination of the roadway. For this reason, for the main-beam function of the headlight assembly according to various embodiments the optical axes L1 and L2 of the headlights 1 and 2 are tilted toward one another horizontally relative to a parallel orientation as is shown in FIG. 5. Therefor, the control devices 13 and 14 each comprise a memory in which, for the main-beam function, parameters for the tilting angle of the optical axes L1 and L2 of the headlights 1 and 2 are stored.

Preferably, the optical axes L1 and L2 are tilted toward one another not only horizontally, but further also are tilted downward vertically. The parameters stored in the control devices 13 and 14 thereby lead to a tilting of the optical axes L1 and L2 for the main-beam function, by means of which the optical axes L1 and L2 intersect at a defined distance in front of the vehicle 10 in the center between the headlights 1 and 2. This intersection point is denoted with numeral S in FIG. 5. For example, the intersection point 5 is on the roadway in a range of 200 m to 500 m, particularly 250 m in front of the vehicle, in particular when the roadway is flat.

Considering an Isolux illustration, which is shown for the dipped-beam function in FIG. 3 for the main-beam function, it arises as a result that relative to the dipped-beam function the optical axes L1 and L2 for the main-beam function are adjusted such that the optical axes, which pass through the center of the respective light source of the headlights 1 and 2 and through the maximum value of the intensity of illumination on the measurement screen in a distance of 10 m, intersect in front of the vehicle 10 at a distance stored as parameters in the control devices 13 and 14.

REFERENCE NUMERALS

1 right headlight
2 left headlight
3 light source
4 housing
5 light panel
6 reflector
7 projection lens
8 first aperture
9 second aperture
10 vehicle comprising the headlight assembly
12 vehicle driving in front
13 control device for the right headlight
14 control device for the left headlight
15 device for detecting other traffic participants
16 control device
17 vehicle bus
L1 and L2 optical axes
S intersection point of the optical axes for the main-beam function

What is claimed is:

1. A method for controlling a headlight assembly for a vehicle comprising a right and a left headlight unit, comprising:
   for a dipped-beam function: tilting the optical axes of the headlight units away from one another horizontally relative to a parallel orientation,
   and
   for a main-beam function: tilting the optical axes of the headlight units towards one another horizontally relative to a parallel orientation.

2. The method according to claim 1, further comprising detecting a traffic participant in direction of the light emission of the headlight assembly and controlling the light distribution generated by the headlight assembly for the dipped-beam function depending on the position of the traffic participant relative to the vehicle.

3. The method according to claim 2, further comprising altering the light distribution generated by the headlight assembly for the dipped-beam function such that in direction of the detected traffic participant a central area comprising lesser headlight range and on both sides lateral to the central area lateral zones comprising larger headlight range are formed.

4. The method according to claim 1, further comprising detecting the angle of a traffic participant vertical relative to the headlight assembly in direction of the light emission of the headlight assembly and for the dipped-beam function, controlling the headlight range in direction of the detected traffic participant depending on the vertical angle of the traffic participant.

5. The method according to claim 1, further comprising for the main-beam function, tilting the optical axes of the headlight units downward vertically relative to a horizontal orientation.

6. The method according to claim 1, further comprising for the main-beam function, tilting the optical axes of the headlight units such that they intersect in the center between the headlight units at a defined distance in front of the vehicle.

7. The method according to claim 6, wherein the intersection point of the optical axes is located in a range of 200 m to 500 m in front of the vehicle.

8. A headlight assembly for a vehicle comprising a right and a left headlight unit and at least one control device, wherein for a dipped-beam function the optical axes of the headlight units may be tilted away from one another horizontally relative to a parallel orientation by means of the control device, and wherein
   for a main-beam function, the optical axes of the headlight units may be tilted towards on another horizontally relative to a parallel orientation by means of the control device.

9. The headlight assembly according to claim 8, wherein the headlight assembly is coupled with a device for detecting a traffic participant in direction of the light emission of the headlight assembly and light distribution may be adjusted by means of the control device depending on the position of the other traffic participant relative to the vehicle.

10. The headlight assembly according to claim 8, wherein for the main-beam function, the headlight assembly comprises a memory in which parameters for the tilting angles of the optical axes of the headlight units are stored.

11. A system for controlling a headlight assembly for a vehicle comprising a right and a left headlight unit, comprising:
a control means coupled with said right and left headlight unit, wherein for a dipped-beam function the control means are operable to tilt the optical axes of the headlight units away from one another horizontally relative to a parallel orientation,
and for a main-beam function the control means to tilt the optical axes of the headlight units towards one another horizontally relative to a parallel orientation.

12. The system according to claim 11, wherein the control means are further operable to detect a traffic participant in direction of the light emission of the headlight assembly and to control the light distribution generated by the headlight assembly for the dipped-beam function depending on the position of the traffic participant relative to the vehicle.

13. The system according to claim 11, wherein the control means are further operable to alter the light distribution generated by the headlight assembly for the dipped-beam function such that in direction of the detected traffic participant a central area comprising lesser headlight range and on both sides lateral to the central area lateral zones comprising larger headlight range are formed.

14. The system according to claim 11, wherein the control means are further operable to detect the angle of a traffic participant vertical relative to the headlight assembly in direction of the light emission of the headlight assembly and for the dipped-beam function, to control the headlight range in direction of the detected traffic participant depending on the vertical angle of the traffic participant.

15. The system according to claim 11, wherein the control means are further operable, for the main-beam function, to tilt the optical axes of the headlight units downward vertically relative to a horizontal orientation.

16. The system according to claim 11, wherein the control means are further operable,
for the main-beam function, to tilt the optical axes of the headlight units such that they intersect in the center between the headlight units at a defined distance in front of the vehicle.

17. The system according to claim 16, wherein
the intersection point of the optical axes is located in a range of 200 m to 500 m in front of the vehicle.

18. The system according to claim 16, wherein each headlight unit comprises a light source which is reflected by a reflector in direction of a projection lens and an aperture arrangement comprising two-dimensional apertures arranged at a focal position of the projection lens.

19. The system according to claim 18, wherein normals of the two-dimensional apertures substantially are arranged parallel to a light emission direction.

20. The system according to claim 18, wherein the light source, the reflector, the lens and the apertures are arranged within a housing which is completed by a light panel.

* * * * *